(12) United States Patent
Sato et al.

(10) Patent No.: US 7,532,974 B2
(45) Date of Patent: May 12, 2009

(54) FUEL CONSUMPTION ESTIMATING UNIT OF VEHICLE

(75) Inventors: Tasuku Sato, Tokyo (JP); Masayuki Kayano, Tokyo (JP); Shogo Matsuura, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 209 days.

(21) Appl. No.: 11/258,410

(22) Filed: Oct. 25, 2005

(65) Prior Publication Data

US 2006/0089785 A1 Apr. 27, 2006

(30) Foreign Application Priority Data

Oct. 25, 2004 (JP) ............................. 2004-309689

(51) Int. Cl.
*G06G 7/70* (2006.01)
*G06F 19/00* (2006.01)

(52) U.S. Cl. .................. 701/123; 701/103; 701/64; 701/101; 701/113; 701/10; 180/65.3; 73/114.52; 73/114.53

(58) Field of Classification Search ................ 701/123, 701/103, 64, 101, 113, 110; 73/113, 114, 73/114.52, 114.53; 180/65.3
See application file for complete search history.

(56) References Cited

U.S. PATENT DOCUMENTS

| | | | | |
|---|---|---|---|---|
| 4,160,376 A | * | 7/1979 | Borkan | 73/114.53 |
| 4,411,174 A | | 10/1983 | Yokoi et al. | |
| 4,570,226 A | * | 2/1986 | Aussedat | 701/123 |
| 4,845,630 A | * | 7/1989 | Stephens | 701/123 |
| 5,652,378 A | * | 7/1997 | Dussault | 73/114.52 |
| 5,913,917 A | * | 6/1999 | Murphy | 701/123 |
| 6,081,661 A | * | 6/2000 | Tanimoto et al. | 703/2 |
| 6,092,021 A | * | 7/2000 | Ehlbeck et al. | 701/123 |
| 6,275,768 B1 | * | 8/2001 | Zobell et al. | 701/123 |
| 6,453,731 B1 | * | 9/2002 | Yaegashi | 73/114.52 |
| 6,484,088 B1 | * | 11/2002 | Reimer | 701/123 |
| 6,691,025 B2 | * | 2/2004 | Reimer | 701/123 |
| 6,694,806 B2 | * | 2/2004 | Kumagai et al. | 73/114.52 |
| 6,985,804 B2 | * | 1/2006 | Minami | 701/64 |
| 7,226,675 B2 | * | 6/2007 | Ovshinsky et al. | 429/9 |

(Continued)

FOREIGN PATENT DOCUMENTS

DE 2925118 A1 1/1981

(Continued)

OTHER PUBLICATIONS

Sato et al; Unpublished U.S. Appl. No. 11/258,411, filed Oct. 25, 2005; pp. 1-16; 5 drawing sheets, figs. 1-8.

(Continued)

*Primary Examiner*—Thomas G Black
*Assistant Examiner*—Wae Louie
(74) *Attorney, Agent, or Firm*—Rossi, Kimms & McDowell LLP

(57) ABSTRACT

Parameters having a correlation with a crowded condition of a road traveled by a vehicle are inputted to an ideal fuel consumption estimation model. This ideal fuel consumption estimation model estimates an ideal fuel consumption of vehicle based on the parameters. The ideal fuel consumption of vehicle estimated by the ideal fuel consumption estimation model is outputted to an output portion.

3 Claims, 5 Drawing Sheets

U.S. PATENT DOCUMENTS

| | | | |
|---|---|---|---|
| 7,274,987 B2 * | 9/2007 | Ishiguro | 701/123 |
| 2002/0132699 A1 | 9/2002 | Bellinger | |
| 2006/0089781 A1 * | 4/2006 | Sato et al. | 701/103 |

FOREIGN PATENT DOCUMENTS

| | | |
|---|---|---|
| DE | 19605458 C1 | 9/1997 |
| DE | 19901532 A1 | 7/2000 |
| EP | 1018449 A2 | 7/2000 |
| EP | 1191313 A2 | 3/2002 |
| JP | 08074626 A | 3/1996 |
| JP | 10122883 A | 5/1998 |
| JP | 11-180185 A | 7/1999 |
| JP | 2001108503 A | 4/2001 |
| JP | 20004-98726 A | 4/2004 |
| KR | 20030038990 A | 5/2003 |
| WO | 8301686 | 5/1983 |
| WO | 0017610 | 3/2000 |

OTHER PUBLICATIONS

Office Action issued in the corresponding German application No. 10 2005 050 921.5, mailed Jul. 27, 2007.

Office Action dated Feb. 26, 2008 issued in German Patent Application No. 10 2005 050 922.3-52, which corresponds with related co-pending U.S. Appl. No. 11/258,411.

Notices of Reasons for Rejection issued in corresponding application JP 2004-309689, mailed Jan. 6, 2009.

* cited by examiner

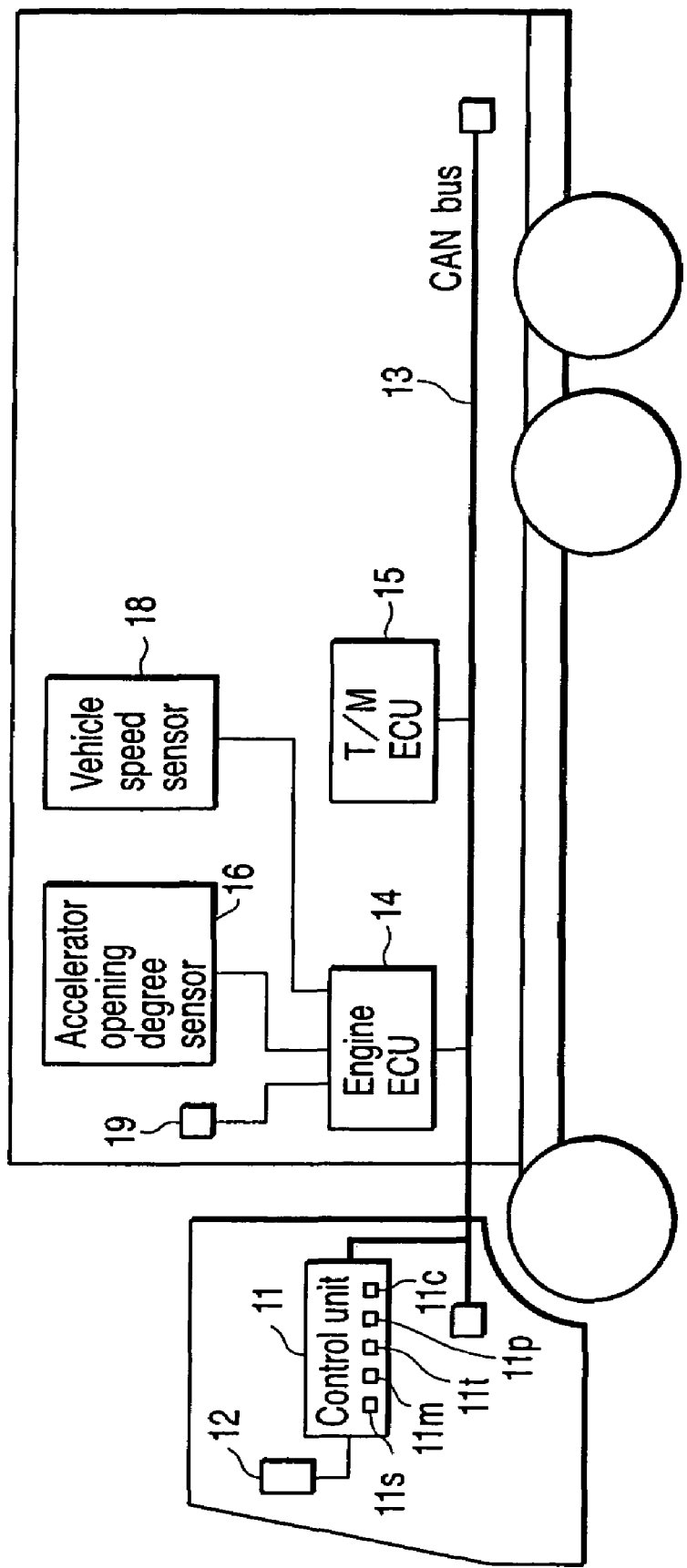
F I G. 5

| Analysis method | Error [%] |
|---|---|
| Support Vector Machine | 116 |
| Radial Basis Function Network | 121 |
| Neural Network | 100 |
| K-NN Analysis | 125 |
| Decision Tree | 126 |

FUEL CONSUMPTION ESTIMATING UNIT OF VEHICLE

CROSS-REFERENCE TO RELATED APPLICATIONS

This application is based upon and claims the benefit of priority from prior Japanese Patent Application No. 2004-309689, filed Oct. 25, 2004, the entire contents of which are incorporated herein by reference.

BACKGROUND OF THE INVENTION

1. Field of the Invention

The present invention relates to a fuel consumption estimating unit of vehicle for outputting fuel consumption of vehicle.

2. Description of the Related Art

Fuel consumption of vehicle is determined depending on various factors, for example, vehicle driver's operating condition, weather condition such as atmospheric pressure, engine performance and additionally it has been well known that the fuel consumption differs depending on road condition. As specific example of the road condition, crowded condition of road, quantity of intersections, quantity of curves and the like can be mentioned. For example, if the road is crowded, idling increases thereby worsening fuel consumption and if the quantity of intersections or curve is large, the frequency of stops of vehicle increases or vehicle speed drops, so that the frequency of acceleration/deceleration increases thereby likely worsening fuel consumption.

Therefore, even if a vehicle of the same specification is driven by the same vehicle driver or a different vehicle driver with the same driving technique, a large difference occurs in fuel consumption if the road condition differs, and even if looking at only an actual fuel consumption, whether or not it is a good value under a road condition in which that vehicle runs cannot be evaluated.

BRIEF SUMMARY OF THE INVENTION

An object of the present invention is to provide a fuel consumption estimating unit of vehicle capable of evaluating whether a fuel consumption is good or not under an arbitrary road condition.

According to one aspect of the present invention, there is provided a fuel consumption estimating unit of vehicle comprising: an ideal fuel consumption estimation model configured to estimate an ideal fuel consumption of the vehicle with parameters having a correlation with road condition under which the vehicle runs inputted; and an output portion configured to output the ideal fuel consumption of the vehicle estimated by the ideal fuel consumption estimating model.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic diagram of a truck employing the fuel consumption estimating unit of vehicle according to the same embodiment;

DETAILED DESCRIPTION OF THE INVENTION

Hereinafter, an embodiment of the present invention will be described with reference to the accompanying drawings.

Figure 1:
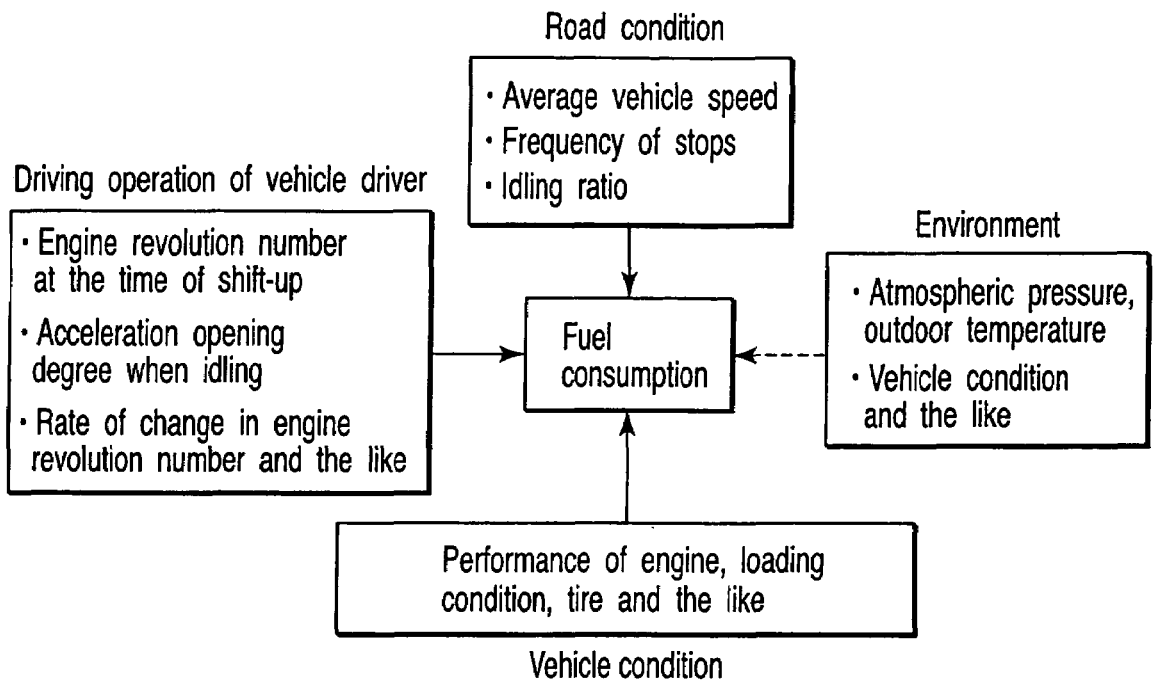
FIG. 1 is a diagram for explaining the principle of a fuel consumption estimating unit of vehicle according to an embodiment of the present invention.

Factors, which affect the fuel consumption of vehicle, will be described with reference to FIG. 1. Factors, which affect the fuel consumption of vehicle, can be largely classified into those originating from road condition, vehicle driver's driving operation, vehicle condition, environment and the like. Of these, the road condition will be explained in detail.

As specific examples of the road condition, the road condition, quantity of intersections, quantity of curves and the like can be mentioned. As a parameter having a correlation with the traffic condition, average vehicle speed $V_{av}$, frequency of stops ST and idling ratio IDD are available. The frequency of stops ST here means the number of stops in a unit time or the number of stops over a unit distance and the idling ratio IDD means a ratio of idle time relative to engine running time, which can be obtained by dividing the idle time by the engine running time.

For example, if the road is crowded or the quantity of intersections or curves is large, the average vehicle speed $V_{av}$ decreases and the frequency of stops ST increases while the idling ratio IDD increases, thereby worsening the fuel consumption.

Next, the system configuration of a truck loaded with the fuel consumption estimating unit of vehicle according to the present invention will be described with reference to FIG. 5.

In FIG. 5, reference numeral 11 denotes a control unit for controlling the fuel consumption estimating unit of the present invention integrally. This control unit 11 is constituted of, for example, a microprocessor, which comprises a memory 11m for memorizing various data, a clock circuit 11c and a timer 11t. A display 12 is connected to this control unit 11. This control unit 11 includes real fuel consumption measuring means 11S for measuring a real fuel consumption by dividing fuel consumption by a running distance. Further, this control unit 11 includes parameter calculating means 11P for calculating a parameter having a correlation with the road condition.

The control unit 11 is connected to an engine ECU (electronic control unit) 14 and a transmission (T/M) ECU (electronic control unit) 15 via a control area network (CAN) bus 13. The control unit 11, the engine ECU 14 and the transmission ECU 15 send/receive various data by communication via this CAN bus 13.

An accelerator opening degree sensor 16 for detecting an accelerator opening degree θ, a clutch connection/disconnection sensor 17 for detecting connection/disconnection of a clutch (not shown), a vehicle speed sensor 18 for detecting a vehicle speed V and an engine revolution number sensor 19 for detecting an engine revolution number Ne are connected to the engine ECU 14.

The transmission ECU 15 outputs a shift-up signal or a shift-down signal to a transmission (not shown).

The parameter calculating means 11P calculates the average vehicle speed $V_{av}$ based on the vehicle speed V sent from the vehicle speed sensor 18 via the engine ECU 14 and the timer 11t.

The parameter calculating means 11P counts the number of stops in a unit time or the number of stops over a unit distance based on the vehicle speed V sent from the vehicle speed sensor 18 and the clock circuit 11C and calculates the counted value as the frequency of stops ST. The number of stops means the number of frequency when the vehicle speed V sent from the vehicle speed sensor 18 turns to substantially zero. In the meantime, a traveling distance is calculated by multiplying the vehicle speed V with the running time.

Further, the parameter calculating means 11P makes calculation of dividing idle time of an engine (not shown) by engine running time to obtain an idling ratio IDD. The idle time is calculated by counting times when the vehicle speed V is substantially zero, the engine is running and the accelerator opening degree θ is zero with the timer 11t. The engine running is obtained from an engine revolution number Ne detected by the engine revolution number sensor 19 via the engine ECU 14.

Next, the operation of the embodiment of the present invention having such a structure will be described.

Figure 3:
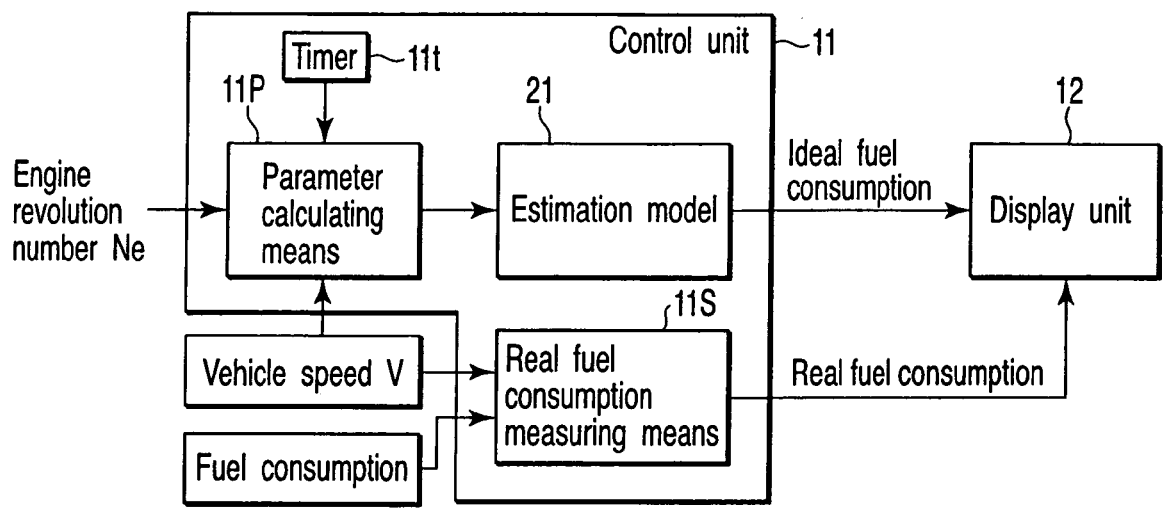
FIG. 3 is a block diagram showing an estimation model for estimating an ideal fuel consumption of vehicle according to the same embodiment.

FIG. 3 shows the functional configuration according to the embodiment of the present invention with a block diagram. The control unit includes the parameter calculating means 11P. Here, the average vehicle speed $V_{av}$, the frequency of stops ST and the idling ratio IDD are calculated according to the above-described method and outputted to an estimation model 21. The estimation model 21 calculates an ideal fuel consumption with parameters ($V_{av}$, ST, IDD) having a correlation with the road condition outputted from the parameter calculating means 11P as input. In the meantime, a method for creating the estimation model 21 will be described later.

On the other hand, the control unit 11 includes real fuel consumption measuring means 11S. The real fuel consumption measuring means 11S calculates a real fuel consumption according to the above-described method.

The ideal fuel consumption obtained in the above way and the real fuel consumption are outputted from the control unit 11 and displayed on a display unit 12. The display unit 12 is installed at, for example, a position easy to see from a vehicle driver, so that the vehicle driver can see the real fuel consumption by his own driving and an ideal fuel consumption on that road condition at the same time.

Figure 2:
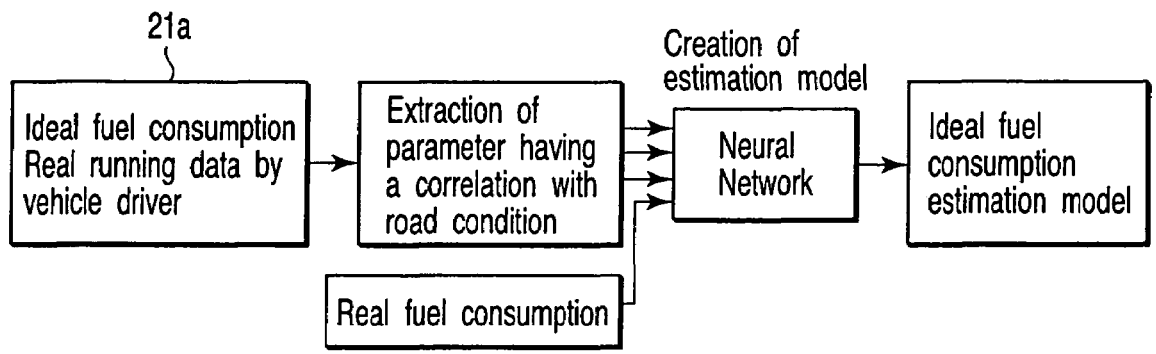
FIG. 2 is a block diagram showing a method for creating an estimation model for estimating an ideal fuel consumption of vehicle according to the same embodiment.

Next, a creation method of the estimation model for estimating an ideal fuel consumption under an arbitrary road condition as shown in FIG. 2 will be described. This estimation model 21 is created in a following method and loaded on the control unit 11.

(1) As parameters having a correlation with the road condition, the average vehicle speed $V_{av}$, the frequency of stops ST and the idling ratio IDD are extracted from real running data 21a produced when a veteran vehicle driver considered to be an ideal vehicle driver drives a truck under various road conditions.

(2) On the other hand, real fuel consumption at this time is measured and memorized.

(3) A fuel consumption estimation model (estimation model 21) for estimating (outputting) a fuel consumption by inputting the parameters having a correlation with the road condition is created by using Neural Network based on such parameters having the correlation with the road condition (average vehicle speed $V_{av}$, frequency of stops ST, idling ratio IDD), extracted in the above (1) and the real fuel consumption memorized in the (2).

The reason why the estimation model 21 outputs the ideal fuel consumption exists in that it is modeled based on actual traveling data (parameter) by a veteran vehicle driver and fuel consumption.

The function of a truck of this embodiment having such created estimation model 21 will be described. For example, if other vehicle driver (hereinafter referred to as vehicle driver A) than the aforementioned veteran vehicle driver (hereinafter referred to as vehicle driver B) drives the same truck on the same road condition, the real fuel consumption and ideal fuel consumption are displayed on the display unit 12 at the same time. They may be expressed with a bar graph with its ordinate axis used for indicating fuel consumption as shown in FIG. 4.

Figure 4:
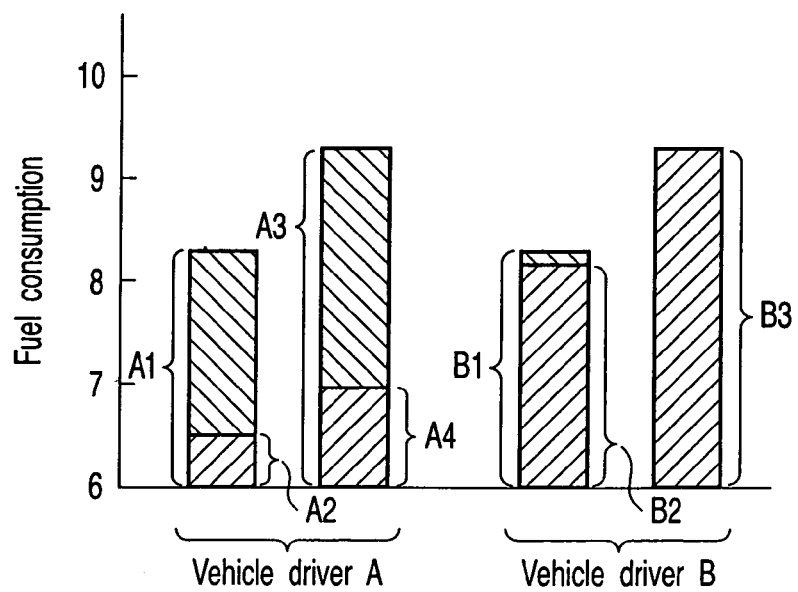
FIG. 4 is a diagram showing the relation between the ideal fuel consumptions by vehicle drivers A, B estimated from the estimation model of the same embodiment and actual fuel consumption.

FIG. 4 shows the real fuel consumption and ideal fuel consumption displayed on the display 12 if the vehicle drivers A, B drive a vehicle on two kinds of road conditions, first and second.

In the same Figure, A1 indicates the ideal fuel consumption by the vehicle driver A on the first road condition, A2 indicates the real fuel consumption by the vehicle driver A on the first road condition, A3 indicates the ideal fuel consumption by the vehicle driver A on the second road condition and A4 indicates the real fuel consumption by the vehicle driver A on the second road condition.

B1 indicates the ideal fuel consumption by the vehicle driver B on the first road condition, B2 indicates the real fuel consumption by the vehicle driver B on the first road condition, and B3 indicates the ideal fuel consumption (=real fuel consumption) by the vehicle driver B on the second road condition.

As evident from this diagram, the real fuel consumption by the vehicle driver A on the same road condition is bad. From this, it is estimated that the reason why the real fuel consumption differs between the vehicle drivers A and B originates from other factor than the road condition (for example, driving operation of the vehicle driver A).

The vehicle driver A can see the real fuel consumption and ideal fuel consumption at the same time because the ideal fuel consumption and real fuel consumption are displayed on the display unit 12 at the same time. By this display, an effect of urging a vehicle driver to change his operation method can be expected. As a result, the driving operation of the vehicle driver can be improved in a direction of improving the fuel consumption.

Figures 6, 7:
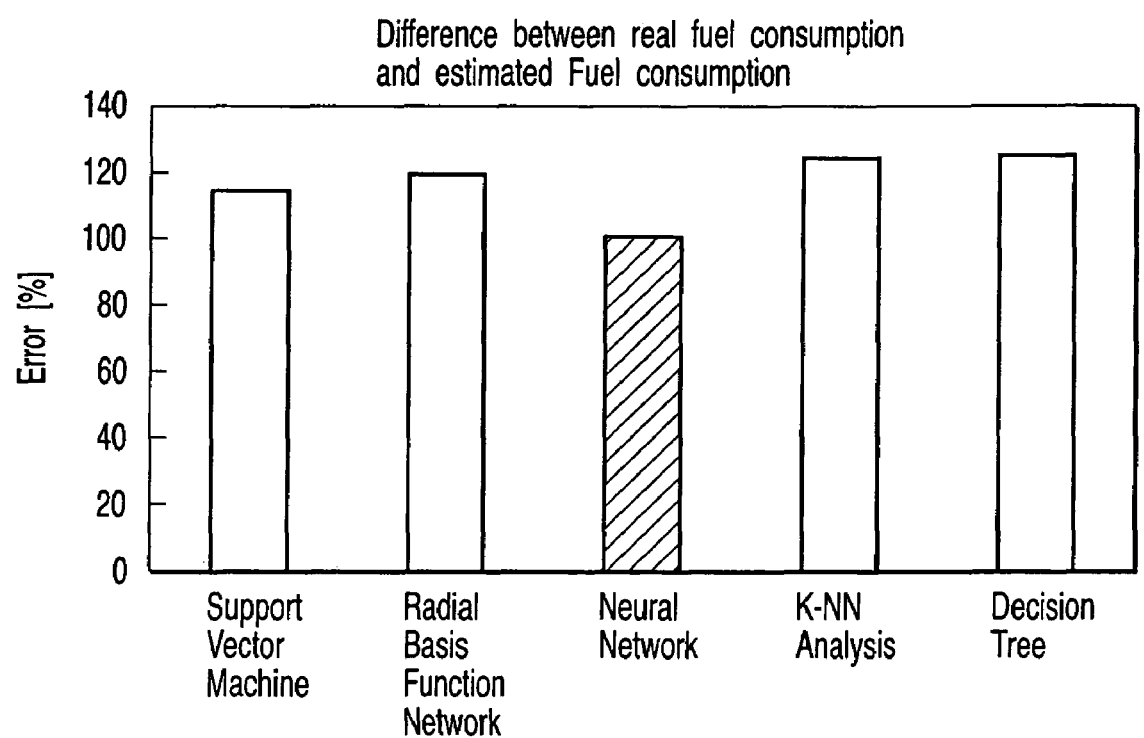
FIG. 6 is a diagram showing an error in the ideal fuel consumption of vehicle estimated with various analysis methods of the same embodiment.
FIG. 7 is a graph showing an error in case of estimating the ideal fuel consumption of vehicle using various analysis methods of the same embodiment.

The above-described embodiment uses Neural Network for creation of the fuel consumption estimation model. As well as this Neural Network, this inventor created a fuel consumption estimation model based on the same data using Support Vector Machine, Radial Basis Function Network, K-NN analysis and Decision Tree. These models were applied to the embodiment of the present invention so as to compare an error between the real fuel consumption and estimated fuel consumption relatively and FIGS. 6, 7 show a Table and graph indicating its result. It was made evident that when using the Neural Network, there is less error between the real fuel consumption and the estimated fuel consumption as compared with other methods, as shown in FIGS. 6, 7.

Figure 8:
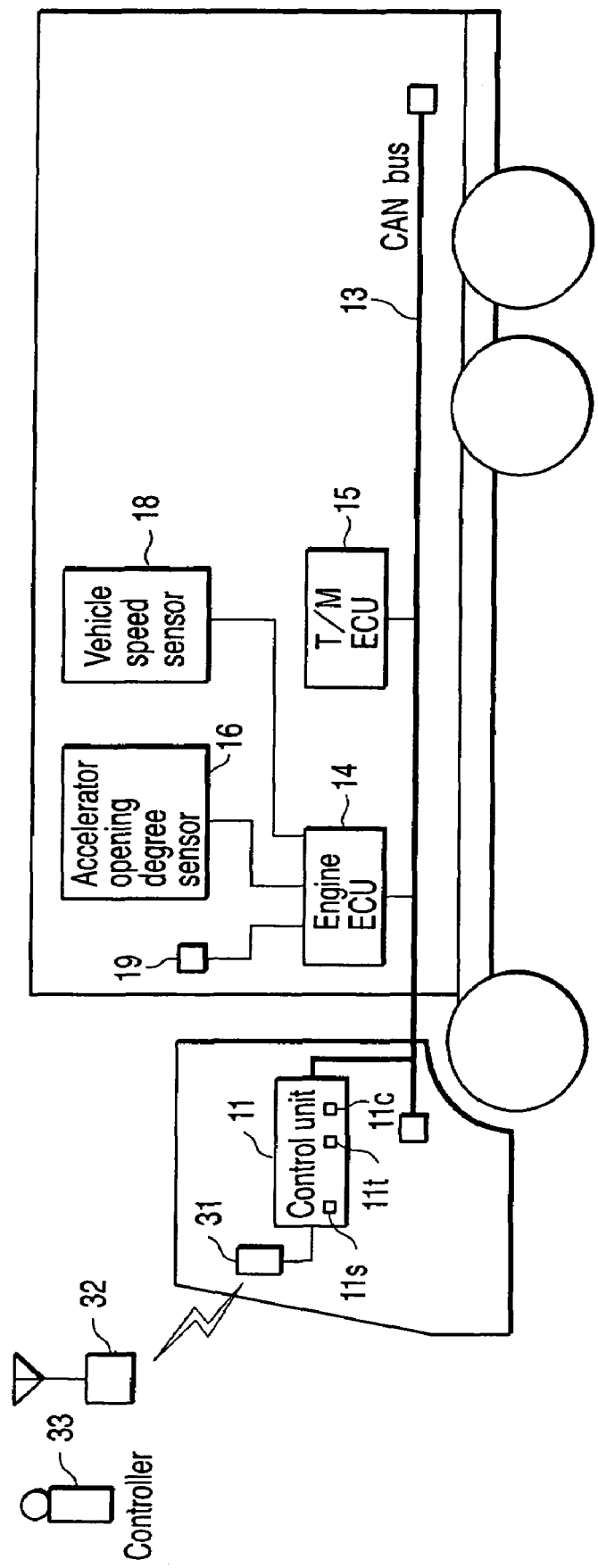
FIG. 8 is a diagram showing another truck employing the fuel consumption estimating unit of vehicle of the present invention.

Although according to the above-described embodiment, a truck system configuration shown in FIG. 5 was adopted, it is permissible to adopt the system configuration of FIG. 8 as well as that of FIG. 5. In the truck shown in FIG. 8, a sending unit 31 is connected to the control unit 11 and the ideal fuel consumption and real fuel consumption are sent to an external receiver 32 by radio and notified to a controller 33.

Although according to the above-described embodiment, as the parameters having a correlation with the road condition, the average vehicle speed $V_{av}$, the frequency of stops ST and the idling ratio IDD are selected, the present invention is not restricted to these, but it is permissible to select a parameter having a correlation with the road condition. Meanwhile, it is needless to say that the parameter selected here needs to have a correlation with the fuel consumption.

Although according to the above-described embodiment, the real fuel consumption and ideal fuel consumption are displayed on the display unit 12 at the same time, they may be outputted to a recording medium or outputted to a printer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ideal fuel consumption estimating unit for a vehicle, comprising:

a timer for measuring a running time of the vehicle during which the vehicle is driven;

a vehicle speed sensor for measuring the vehicle speed in a unit of time during which the vehicle is driven;

an engine revolution number sensor for measuring the revolution of an engine of the vehicle in a unit of time;

a control unit including:

means for calculating parameters having a correlation with a traffic condition on a road, the parameters including an average vehicle speed based on the measured vehicle speed and the measured running time, a frequency of stops of the vehicle based on vehicle speed coming to zero during the running time of the vehicle, and an idling ratio denoting a ratio between an idle time during which the engine is driven at an idling revolution and the engine running time when the vehicle is driven by a vehicle driver considered to be an ideal vehicle driver under the traffic condition on the road;

means for measuring a real fuel consumption of the vehicle; and means for creating an ideal fuel consumption estimation model for estimating an ideal fuel consumption of the vehicle based on the calculated parameters and the real fuel consumption measured by the measuring means; and an output unit for outputting the ideal fuel consumption estimated by the ideal fuel consumption estimation model and the real fuel consumption measured by the real fuel consumption measuring means with respect to a target driver being evaluated.

2. The ideal fuel consumption estimating unit according to claim 1, wherein the output unit displays the ideal fuel consumption and the real fuel consumption at the same time on a display unit installed on the vehicle.

3. The ideal fuel consumption estimating unit according to claim 1, further comprising a sending unit configured to transmit the ideal fuel consumption of the vehicle estimated by the ideal fuel consumption estimating model and the real fuel consumption of the vehicle measured by the real fuel consumption measuring means to outside by radio.

* * * * *